US012734099B1

(12) United States Patent
Yan

(10) Patent No.: US 12,734,099 B1
(45) Date of Patent: Sep. 15, 2026

(54) CONTROL METHOD, ANALYSIS METHOD, AND CONTROL SYSTEM FOR CROSS-CATEGORY SEXUAL STIMULATION DEVICES

(71) Applicant: SINGAPORE JOYHUB TECH PTE. LTD., Singapore (SG)

(72) Inventor: Fei Yan, Chengdu (CN)

(73) Assignee: SINGAPORE JOYHUB TECH PTE. LTD., Singapore (SG)

( * ) Notice: Subject to any disclaimer, the term of this patent is extended or adjusted under 35 U.S.C. 154(b) by 0 days.

(21) Appl. No.: 19/405,461

(22) Filed: Dec. 2, 2025

(30) Foreign Application Priority Data

Nov. 14, 2025 (CN) ........................ 202511678295.2

(51) Int. Cl.
*A61H 19/00* (2006.01)

(52) U.S. Cl.
CPC ..... *A61H 19/00* (2013.01); *A61H 2201/5005* (2013.01)

(58) Field of Classification Search
None
See application file for complete search history.

(56) References Cited

U.S. PATENT DOCUMENTS 12,171,708 B2 12/2024 Qiu et al.
2024/0024190 A1* 1/2024 Kuncewicz ............ G06V 20/44
2025/0009594 A1 1/2025 Qiu et al.
2025/0365483 A1* 11/2025 Liu ....................... A61H 19/30

FOREIGN PATENT DOCUMENTS

CN 114469665 A 5/2022
CN 115670889 A 2/2023

* cited by examiner

*Primary Examiner* — Thaddeus B Cox
(74) *Attorney, Agent, or Firm* — Ming Jiang; OPENPTO US LLC

(57) ABSTRACT

A control method for cross-category sexual stimulation devices includes: in response to a first user's operation of selecting a target waveform graph, acquiring a waveform description file of the target waveform graph; acquiring device characteristics of a first sexual stimulation device of the first user, where the first sexual stimulation device and a second sexual stimulation device are sexual stimulation devices of the same category or different categories; matching the waveform description file with the device characteristics of the first sexual stimulation device through a second AI model to generate a control instruction; and sending the control instruction to the first sexual stimulation device to execute stimulation. The above method ensures that devices of different categories reproduce a core experience of a same waveform, which breaks the limitation that waveforms are only applicable to devices of the same category, and improves a utilization rate of waveform graph resources.

20 Claims, 4 Drawing Sheets

CONTROL METHOD, ANALYSIS METHOD, AND CONTROL SYSTEM FOR CROSS-CATEGORY SEXUAL STIMULATION DEVICES

CROSS-REFERENCE OF RELATED APPLICATION

The present application claims priority to Chinese Patent Application No. 202511678295.2 filed on Nov. 14, 2025, which is incorporated herein by reference in its entirety.

TECHNICAL FIELD

The present disclosure relates to the technical field of data processing, and in particular to a control method, analysis method, and control system for cross-category sexual stimulation devices.

BACKGROUND

With the deep integration of smart hardware technology and the Internet community, sexual stimulation devices have gradually evolved toward intelligence and personalization, deriving user interaction methods based on waveform content sharing. A user may upload a waveform graph when using a sexual stimulation device or download waveform graphs shared by other users, to reproduce a sexual stimulation process of any other user in which he/she is interested through the sexual stimulation device.

However, research findings indicate that the above interaction method has the following defects: A waveform graph uploaded by a user is deeply bound to a specific sexual stimulation device, resulting in the lack of cross-category device adaptability. Since sexual stimulation devices of different categories exhibit significant differences in hardware architectures, performance parameters, and action execution logics (for example, male sexual stimulation devices and female sexual stimulation devices are completely different in designs and functions, and sexual stimulation devices of the same category are not completely the same in functions), a mode and parameter range of a waveform graph generated based on a sexual stimulation device of a certain category cannot accurately match sexual stimulation devices of other categories. As a result, the waveform graph downloaded by the user is only applicable to a specific sexual stimulation device or devices of the same category; and once a sexual stimulation device of a different category is replaced, waveform content cannot be effectively parsed and executed, such that waveform experience interoperability across sexual stimulation devices of different categories cannot be achieved, which leads to a low utilization rate of massive high-quality waveform resources and limits the user's freedom to select waveform graphs for sexual stimulation devices of different categories.

SUMMARY

In order to solve the above technical problems, the present disclosure provides a control method, analysis method, and control system for cross-category sexual stimulation devices.

In a first aspect, a control method for cross-category sexual stimulation devices is provided in an embodiment of the present disclosure, including: in response to a first user's operation of selecting a target waveform graph, acquiring a waveform description file of the target waveform graph, where the waveform description file is generated after parsing the target waveform graph by a first AI model and represents phased experiential characteristics corresponding to the target waveform graph, and the target waveform graph is uploaded by a second user and represents a sexual stimulation process of using a second sexual stimulation device by the second user; acquiring device characteristics of a first sexual stimulation device of the first user, where the first sexual stimulation device and the second sexual stimulation device are sexual stimulation devices of the same category or different categories; matching the waveform description file with device characteristics of the first sexual stimulation device through a second AI model to generate a control instruction; and sending the control instruction to the first sexual stimulation device to execute stimulation.

Optionally, the waveform description file of the target waveform graph is obtained by the following steps including: parsing the target waveform graph through the first AI model to extract parameter characteristics of the target waveform graph; and generating the waveform description file of the target waveform graph based on the parameter characteristics of the target waveform graph.

Optionally, the parameter characteristics of the target waveform graph include at least one of a rhythm mode, a numerical contour, and an action mode; where the rhythm mode represents a rhythmic law of stimulation by a sexual stimulation device; the numerical contour represents a variation trend of stimulation parameter values; and the action mode represents a stimulation action of the sexual stimulation device.

Optionally, the rhythm mode includes at least one of a continuous mode, a pulse mode, a wave mode, a variable frequency mode, a ramp-up mode, or a ramp-down mode.

Optionally, the action mode includes at least one of vibration, kneading, tapping, rolling, acupressure, sucking, squeezing, swinging, and telescoping.

Optionally, the method further includes: receiving a usage experience description from the first user; and optimizing the first AI model based on the usage experience description.

Optionally, the device characteristics include functional features and stimulation intensity parameters; and the functional features include the rhythm mode and the action mode.

Optionally, the matching the waveform description file with the device characteristics of the first sexual stimulation device through a second AI model to generate a control instruction includes: inputting the waveform description file and the device characteristics of the first sexual stimulation device into the second AI model to determine a rhythmic law, stimulation action, and stimulation intensity of the first sexual stimulation device that match the waveform description file; and generating a control instruction based on the matched rhythmic law, stimulation action, and stimulation intensity.

Optionally, the phased experiential characteristics include experiential characteristics of N phases; N is a positive integer greater than or equal to 2; the matching the waveform description file with the device characteristics of the first sexual stimulation device through a second AI model to generate a control instruction includes: inputting the waveform description file and the device characteristics of the first sexual stimulation device into the second AI model to determine a rhythmic law, stimulation action, and stimulation intensity of the first sexual stimulation device that match each phase; determining a control strategy for N phases based on the rhythmic law, stimulation action, and stimulation intensity that match each phase; and generating a control instruction based on the control strategy for N phases.

Optionally, N is four; and the four phases include a foreplay phase, a plateau phase, an orgasm phase, and a resolution phase.

Optionally, the matching the waveform description file with the device characteristics of the first sexual stimulation device through a second AI model to generate a control instruction includes: acquiring parameter characteristics of the target waveform graph; inputting the parameter characteristics of the target waveform graph, the waveform description file, and the device characteristics of the first sexual stimulation device into the second AI model to generate a control instruction; where the parameter characteristics of the target waveform graph include at least one of a rhythm mode and an action mode; and the parameter characteristics of the first sexual stimulation device include at least one of a rhythm mode and an action mode.

Optionally, the inputting the parameter characteristics of the target waveform graph, the waveform description file, and the device characteristics of the first sexual stimulation device into the second AI model to generate a control instruction includes: associating the parameter characteristics of the target waveform graph with the device characteristics of the first sexual stimulation device through the second AI model to determine device characteristics that meet parameter conditions; generating the control instruction by combining the device characteristics that meet parameter conditions and the waveform description file; where the device characteristics that meet parameter conditions are determined in the following manner: When the device characteristics of the first sexual stimulation device include the same parameter characteristics in the target waveform graph, the device characteristics are directly adopted; and when the device characteristics of the first sexual stimulation device do not include the same parameter characteristics in the target waveform graph, device characteristics that meet parameter conditions are determined based on similarity calculation.

Optionally, the determining device characteristics that meet parameter conditions based on similarity calculation includes: determining device characteristics that meet parameter conditions based on a similarity between the device characteristics of the first sexual stimulation device and the target parameter characteristics in the target waveform graph.

Optionally, the determining device characteristics that meet parameter conditions based on similarity calculation includes: determining device characteristics that meet parameter conditions based on a similarity between the device characteristics of the first sexual stimulation device and the waveform description file.

Optionally, the acquiring parameter characteristics of the target waveform graph includes: parsing the target waveform graph through the first AI model to extract parameter characteristics of the target waveform graph.

Optionally, the first AI model and the second AI model belong to the same AI model.

Optionally, the method further includes: acquiring an operating parameter of the first sexual stimulation device, where the operating parameter includes at least one of a battery level and a temperature; and optimizing the control instruction based on the operating parameter of the first sexual stimulation device.

Optionally, the phased experiential characteristics include time parameters; the time parameters are used to describe a duration of each phase; and correspondingly, the control instruction includes a time instruction for controlling the duration of each phase of the first sexual stimulation device to be the same as a duration of a corresponding phase in the target waveform graph.

In a second aspect, a waveform analysis method for cross-category sexual stimulation devices is provided in the present disclosure, including: acquiring a waveform graph uploaded by the user, where the waveform graph represents a sexual stimulation process of using a sexual stimulation device by the user; parsing the waveform graph through the first AI model to extract parameter characteristics of the waveform graph; generating a waveform description file of the waveform graph based on the parameter characteristics of the waveform graph; where the waveform description file represents phased experiential characteristics corresponding to the waveform graph; and binding the waveform description file of the waveform graph with the waveform graph.

In a third aspect, a waveform control system for cross-category sexual stimulation devices is provided by the present disclosure, including: a service platform configured to display waveform graphs uploaded by different users, where the waveform graphs represent sexual stimulation processes of using sexual stimulation devices by different users; and a plurality of terminal devices, configured to acquire a waveform description file of the target waveform graph in response to a target user's operation of selecting a target waveform graph, where the waveform description file is generated after parsing the target waveform graph by a first AI model and represents phased experiential characteristics corresponding to the target waveform graph; acquire device characteristics of a sexual stimulation device of the target user, where the target user's sexual stimulation device and a sexual stimulation device corresponding to the target waveform graph are sexual stimulation devices of the same category or different categories; match the waveform description file with the device characteristics of the target user's sexual stimulation device through a second AI model to generate a control instruction; and send the control instruction to the target user's sexual stimulation device to execute stimulation.

The present disclosure has the following beneficial effects: An original waveform graph is decoupled from hardware binding of the second sexual stimulation device by generating a waveform description file representing phased experiential characteristics through the first AI model; and then adaptive conversion is performed based on the device characteristics of the first sexual stimulation device through the second AI model, such that devices of different categories (such as vibration-type and suction-type devices) reproduce a core experience of a same waveform, which breaks the limitation that waveforms are only applicable to devices of the same category, and improves a utilization rate of waveform graph resources and a freedom of selection by the user.

Additionally, the second AI model deeply combines specific device characteristics of the first sexual stimulation device to generate an accurately adapted control instruction, thereby preventing an experience deviation caused by device differences.

In summary, the method provided in the embodiments of the present disclosure is applicable to devices of different categories and models, which greatly enriches a distribution range of waveform community content; users replace sexual stimulation devices without need to reselect waveforms, thereby reducing usage costs; and for the industry, the transformation of sexual stimulation devices from being hardware-driven to being experience-driven is promoted, which facilitates cross-brand and cross-category ecological collaboration.

DETAILED DESCRIPTION OF PREFERRED EMBODIMENTS

In the following description, specific details, such as specific system structures and technology, are set forth for the purpose of explanation rather than limitation, so as to thoroughly understand embodiments of the present disclosure. However, it should be understood by those skilled in the art that the present disclosure may be implemented in other embodiments without these specific details. In other instances, detailed descriptions of well-known systems, devices, circuits and methods are omitted so as to prevent unnecessary details from obscuring the description of the present disclosure.

Moreover, in the description of the specification and the appended claims of the present disclosure, the terms "first", "second", "third", and the like are used merely to distinguish between descriptions and may not be construed as indication or implication of relative importance.

Research findings indicate that the above interaction method has the following defects: A waveform graph uploaded by a user is deeply bound to a specific sexual stimulation device, resulting in the lack of cross-category device adaptability. Since sexual stimulation devices of different categories exhibit significant differences in hardware architectures, performance parameters, and action execution logics (for example, male sexual stimulation devices and female sexual stimulation devices are completely different in designs and functions, and sexual stimulation devices of the same category are not completely the same in functions), a mode and parameter range of a waveform graph generated based on a sexual stimulation device of a certain category cannot accurately match sexual stimulation devices of other categories. As a result, the waveform graph downloaded by the user is only applicable to a specific sexual stimulation device or devices of the same category; and once a sexual stimulation device of a different category is replaced, waveform content cannot be effectively parsed and executed, such that waveform experience interoperability across sexual stimulation devices of different categories cannot be achieved, which leads to a low utilization rate of massive high-quality waveform resources and limits the user's freedom to select waveform graphs for sexual stimulation devices of different categories.

In view of the above problems, the present disclosure provides the following embodiments to solve the above technical problems.

Figure 1:
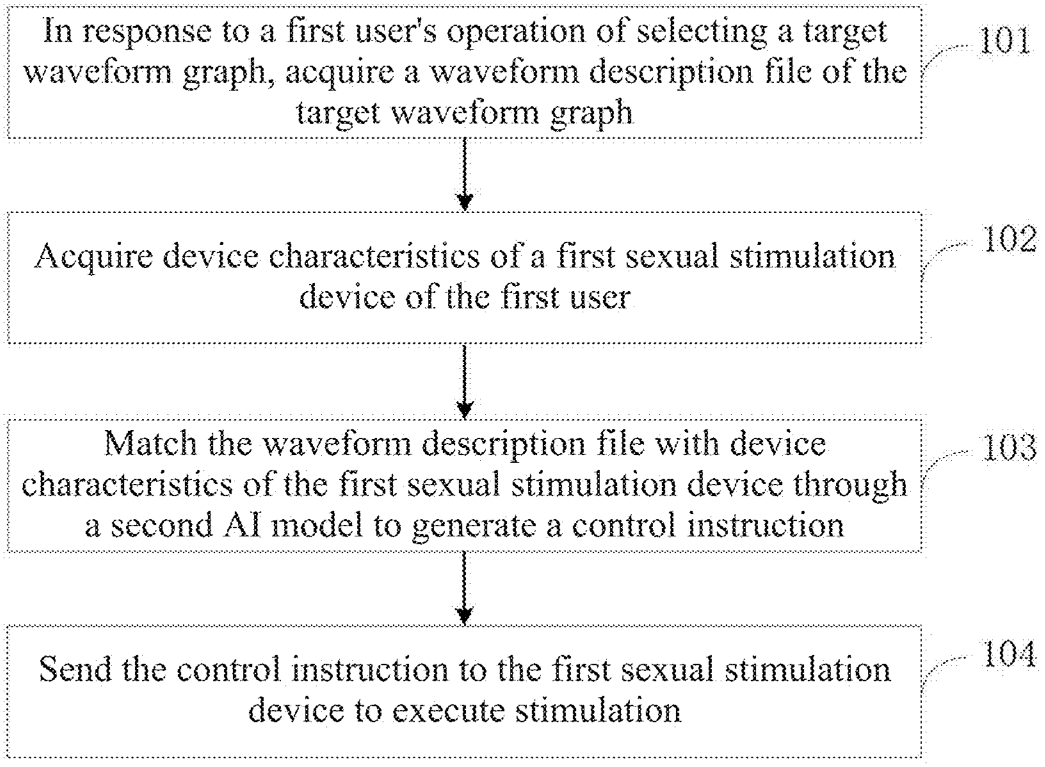
FIG. 1 is a flowchart of steps of a first control method for cross-category sexual stimulation devices provided in an embodiment of the present disclosure.

With reference to FIG. 1, a control method for cross-category sexual stimulation devices is provided in an embodiment of the present disclosure, including: steps 101 to 104.

Step 101: in response to a first user's operation of selecting a target waveform graph, acquire a waveform description file of the target waveform graph.

The waveform description file is generated after parsing the target waveform graph by a first AI model and represents phased experiential characteristics corresponding to the target waveform graph. The target waveform graph is uploaded by a second user and represents a sexual stimulation process of using a second sexual stimulation device by the second user.

Specifically, a service platform, i.e., a community platform, is provided in an embodiment of the present disclosure. Different users may upload waveform graphs in use of sexual stimulation devices to the service platform. Then, other users may select waveform graphs of interest to them through the service platform.

In the above step description, the first user represents a user who selects a waveform graph from the service platform, i.e., a receiver of the waveform graph. The second user represents a user who uploads a waveform graph to the service platform, i.e., a generator of the waveform graph. However, in practical applications, the first user may upload a waveform graph in use of a sexual stimulation device, and the second user may select a waveform graph uploaded by another user for use, where the first user and the second user are designated only to better distinguish and understand the above process and are not intended as limitations. The above target waveform graph may be any waveform graph uploaded to the service platform.

For example, after the first user selects a target waveform graph of interest among a plurality of waveform graphs from the service platform, a waveform description file of the target waveform graph is extracted.

The waveform description file represents phased experiential characteristics corresponding to the target waveform graph, such as a gentle rhythm in an early stage, a strong impact in an orgasm stage, and other phased experiential characteristics.

Step 102: acquire device characteristics of a first sexual stimulation device of the first user.

The first sexual stimulation device and the second sexual stimulation device are sexual stimulation devices of the same category or different categories.

It should be noted that sexual stimulation devices of the above different categories may include sexual stimulation devices of different types, sexual stimulation devices with different functions, sexual stimulation devices from different manufacturers, or sexual stimulation devices of different models from the same manufacturer.

For example, the first sexual stimulation device is a male sexual stimulation device, and the second sexual stimulation device is a female sexual stimulation device.

For example, the first sexual stimulation device is a vibrating wand with vibration and suction functions; and the second sexual stimulation device is a vibrating wand with vibration, tapping, and suction functions.

For example, the first sexual stimulation device is a masturbation cup produced by a manufacturer A; and the second sexual stimulation device is a masturbation cup produced by a manufacturer B.

For example, the first sexual stimulation device is a masturbation cup of a model A1 produced by the manufacturer A; and the second sexual stimulation device is a masturbation cup of a model A2 produced by the manufacturer A. The masturbation cup of the model A1 and the masturbation cup of the model A2 have different vibration frequencies and ranges.

That is, the method provided in the embodiments of the present disclosure is applicable to both sexual stimulation devices of the same category and sexual stimulation devices of different categories.

Step 103: match the waveform description file with the device characteristics of the first sexual stimulation device through a second AI model to generate a control instruction.

That is, the waveform description file and the device characteristics of the first sexual stimulation device are input into the second AI model, and adaptation is performed through the second AI model, where a processing logic is to maximally reproduce the phased experiential characteristics corresponding to the waveform description file according to the device characteristics of the first sexual stimulation device and then generate a control instruction for driving the first sexual stimulation device.

Step 104: send the control instruction to the first sexual stimulation device to execute stimulation.

Finally, the generated control instruction is sent to the first sexual stimulation device for sexual stimulation, to reproduce a phased experience corresponding to the target waveform graph.

A specific example is given below to illustrate the above method:

The second user uploads a waveform graph S using a vibrating wand A, then the first user selects the waveform graph S, and the sexual stimulation device used by the first user is a masturbation cup B that is different from the vibrating wand A in category. After the first user uploads the waveform graph S, the first AI model parses the waveform graph S to generate a waveform description file representing phased experiential characteristics corresponding to the waveform graph S, and for example, the waveform description file specifically includes: a phase 1, low-intensity continuous stimulation, and a phase 2, high-intensity periodic stimulation. Then, device characteristics of the masturbation cup B are identified, and then the device characteristics of the masturbation cup B and the waveform description file are input into the second AI model to generate a control instruction for driving the masturbation cup B. Then, the control instruction is sent to the masturbation cup B to reproduce the phased experiential characteristics corresponding to the waveform description file, i.e., the low-intensity continuous stimulation in the phase 1 and the high-intensity periodic stimulation in the phase 2.

In summary, the control method for cross-category sexual stimulation devices provided in the embodiments of the present disclosure has the following beneficial effects:

An original waveform graph is decoupled from hardware binding of the second sexual stimulation device by generating a waveform description file representing phased experiential characteristics through the first AI model; and then adaptive conversion is performed based on the device characteristics of the first sexual stimulation device through the second AI model, such that devices of different categories (such as vibration-type and suction-type devices) reproduce a core experience of a same waveform, which breaks the limitation that waveforms are only applicable to devices of the same category, and improves a utilization rate of waveform graph resources and a freedom of selection by the user.

Additionally, the second AI model deeply combines specific device characteristics of the first sexual stimulation device to generate an accurately adapted control instruction, thereby preventing an experience deviation caused by device differences.

In summary, the method provided in the embodiments of the present disclosure is applicable to devices of different categories and models, which greatly enriches a distribution range of waveform community content; users replace sexual stimulation devices without need to reselect waveforms, thereby reducing usage costs; and for the industry, the transformation of sexual stimulation devices from being hardware-driven to being experience-driven is promoted, which facilitates cross-brand and cross-category ecological collaboration.

It should be noted that the above sexual stimulation devices may include: insertable vibration devices, simulative massage devices, external vibration devices, and ejaculation-delay devices.

For example, the insertable vibration devices may specifically include: vibrating rods, egg-shaped vibrators, anal plugs, double-headed vibrators, and the like.

The simulative massage devices may specifically include: simulated penis structures, simulated anatomical molds, inflatable dolls, and the like.

The external vibration devices may include: breast massagers, masturbation cups, vibrating rings, and the like.

The ejaculation-delay devices may specifically include: penile constriction rings, penis trainers, and the like.

Figure 2:
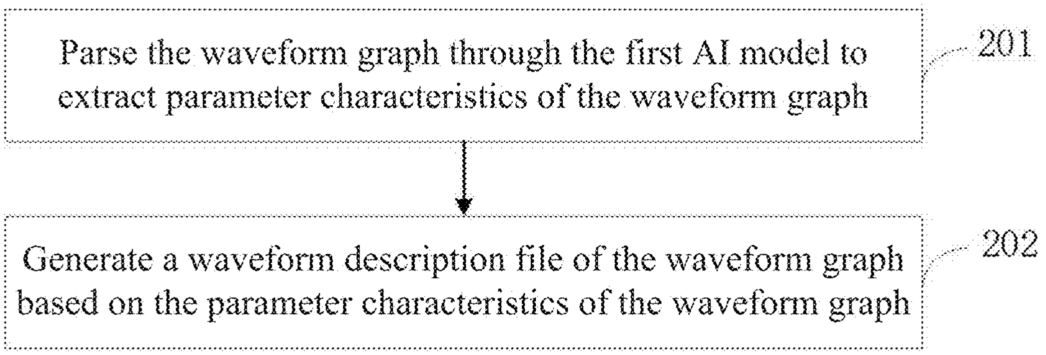
FIG. 2 is a flowchart of steps of a second control method for cross-category sexual stimulation devices provided in an embodiment of the present disclosure.

An execution process of the first AI model is described below. With reference to FIG. 2, optionally, the waveform description file of the target waveform graph is obtained by the following steps: steps 201 to 202.

Step 201: parse the target waveform graph based on the first AI model to extract parameter characteristics of the target waveform graph.

That is, the first AI model parses the original waveform graph to extract parameter characteristics associated with the control of the second sexual stimulation device and/or associated with a usage state of the second sexual stimulation device.

Step 202: generate the waveform description file of the target waveform graph based on the parameter characteristics of the target waveform graph.

Then, the first AI model parses the parameter characteristics of the target waveform graph to generate a waveform description file representing phased experiential characteristics corresponding to the target waveform graph.

It should be noted that a parsing logic of the above first AI model is as follows: Based on the parameter characteristics associated with the control of the second sexual stimulation device and/or associated with the usage state of the second sexual stimulation device parsed from the target waveform graph, experiential performance during a stimulation process is restored to ensure that a device-independent and universal waveform description file is generated, and also ensure that a reproduced experience is highly consistent with an experience expected by the original waveform graph.

Additionally, the above steps may be implemented after the first user selects the target waveform graph or before the first user selects the target waveform graph.

For example, in different scenarios, the first user may select the target waveform graph through his/her own terminal device, and then the first AI model in the terminal device parses the target waveform graph in real time to generate the waveform description file.

For another example, after the second user uploads the target waveform graph to the service platform, the service platform parses the target waveform graph through the first AI model as above to generate the waveform description file. Subsequently, after the first user selects the target waveform graph, the waveform description file bound to the target waveform graph is directly extracted.

Optionally, the parameter characteristics of the target waveform graph include at least one of a rhythm mode, a numerical contour, and an action mode.

The rhythm mode represents a rhythmic law of stimulation by a sexual stimulation device. The rhythm mode may include at least one of a continuous mode, a pulse mode, a wave mode, a variable frequency mode, a ramp-up mode, or a ramp-down mode.

The numerical contour represents a variation trend of stimulation parameter values, and the numerical contour focuses on a variation trend of parameter values.

The action mode represents a stimulation action of the sexual stimulation device. The action mode may include at least one of vibration, kneading, tapping, rolling, acupressure, sucking, squeezing, swinging, and telescoping.

It should be noted that for products, different action modes may usually be distinguished by waveforms of different colors, and therefore, in an embodiment, different action modes may be determined by identifying colors of waveforms.

The above parameter characteristics enable the first AI model to accurately extract parameter characteristics associated with the control of the second sexual stimulation device and/or associated with a usage state of the second sexual stimulation device from the target waveform graph, which provides a standardized input basis for generating a waveform description file to support accurate adaptation of the waveform description file.

In another embodiment, the first AI model may be trained by collecting a large number of sample waveform graphs and labeling each waveform graph (labels represent different user experiences), and then the first AI model learns relationships of mapping of different waveform shapes, frequency variations, and/or waveform trends to user experiences. After the first AI model is trained, a target waveform graph is directly input to generate phased experiential characteristics corresponding to the target waveform graph.

Optionally, the method further includes: receive a usage experience description from the first user; and optimize the first AI model based on the usage experience description.

That is, after selecting the target waveform graph for sexual stimulation, the first user uploads a usage experience to the service platform, then the service platform performs text parsing based on the usage experience to obtain the usage experience description, and then the first AI model is dynamically optimized based on the usage experience description. The usage experience description may include "soothing and delicate in a foreplay phase", "a strong impact in an orgasm phase", and the like.

It should be noted that initial parsing of the first AI model may lead to deviations in parameter characteristic extraction due to factors such as waveform graph noise, and user feedback directly reflects a gap between a reproduced experience and an original experience. After model optimization based on feedback content, the waveform description file more accurately captures parameter characteristics of the original waveform, thereby reducing experience deviations in cross-device adaptation from the source.

Optionally, the device characteristics include functional features and stimulation intensity parameters; and the functional features include the rhythm mode and the action mode.

In this embodiment, reference may be made to the examples in the foregoing embodiments for the rhythm mode and the action mode, which are not limited herein.

The stimulation intensity parameters may be associated with stimulation parameter values. For example, the stimulation intensity parameters may include a vibration intensity of 1-8 levels, a vibration frequency of 20 Hz to 60 Hz, or the like.

Figure 3:
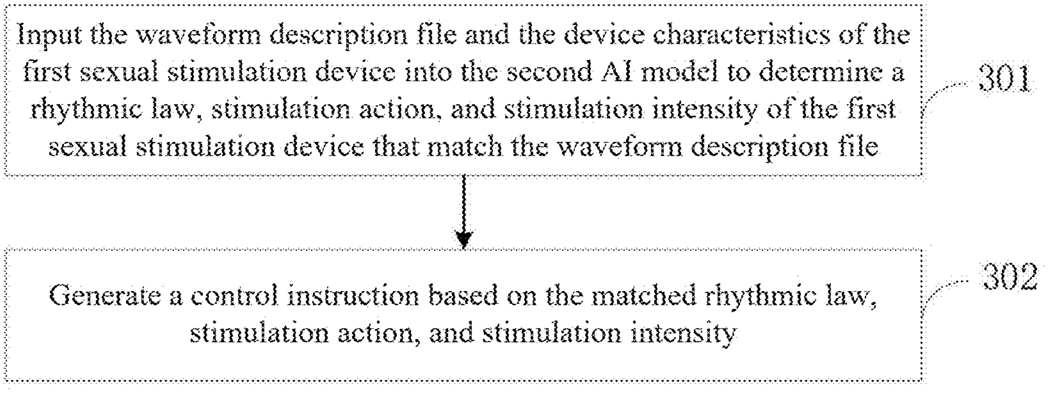
FIG. 3 is a flowchart of steps of a third control method for cross-category sexual stimulation devices provided in an embodiment of the present disclosure.

An execution process of the second AI model is described below. With reference to FIG. 3, optionally, the matching the waveform description file with the device characteristics of the first sexual stimulation device through a second AI model to generate a control instruction includes: steps 301 to 302.

Step 301: input the waveform description file and the device characteristics of the first sexual stimulation device into the second AI model to determine a rhythmic law, stimulation action, and stimulation intensity of the first sexual stimulation device that match the waveform description file.

That is, for the second AI model, input content includes the waveform description file and the device characteristics of the first sexual stimulation device. A matching logic of the second AI model is as follows: a rhythmic law, stimulation action, and stimulation intensity that are closest to the phased experiential characteristics represented by the waveform description file are determined from the device characteristics of the first sexual stimulation device.

For example, when the phased experiential characteristics included in the waveform description file are defined as "stable stimulation in the first phase", and the device characteristics of the first sexual stimulation device include the rhythm mode: the continuous mode or the pulse mode; the stimulation intensity parameters: the vibration frequency of 20 Hz to 60 Hz; and the action mode: vibration or swinging, the rhythm mode matching "stable stimulation in the first phase" may be determined as the continuous mode according to the above matching logic of the second AI model; the stimulation action is vibration; and the stimulation intensity is a vibration frequency of 30 Hz.

Step 302: generate a control instruction based on the matched rhythmic law, stimulation action, and stimulation intensity.

Then, a control instruction for driving the first sexual stimulation device is generated based on the determined rhythmic law, stimulation action, and stimulation intensity.

It can be seen that a target experience is restored from three dimensions (the rhythmic law, stimulation action, and stimulation intensity) in the embodiments of the present disclosure. The rhythmic law ensures that a time rhythm perceived by the user is consistent, the stimulation action ensures that the stimulation is essentially similar, and the stimulation intensity ensures that a parameter variation range is consistent with the performance of the sexual stimulation device used. The collaboration of the three dimensions ensures that an experience reproduced by a cross-category sexual stimulation device is consistent with an experience of the target waveform graph.

Optionally, the phased experiential characteristics include experiential characteristics of N phases; and N is a positive integer greater than or equal to 2.

For example, N may be four in the embodiments of the present disclosure. The four phases may include a foreplay phase, a plateau phase, an orgasm phase, and a resolution phase.

Notably, N may be three. The three phases may include a foreplay phase, an orgasm phase, and a resolution phase.

Correspondingly, the matching the waveform description file with the device characteristics of the first sexual stimulation device through a second AI model to generate a control instruction may specifically include: input the waveform description file and the device characteristics of the first sexual stimulation device into the second AI model to determine a rhythmic law, stimulation action, and stimulation intensity of the first sexual stimulation device that match each phase; determine a control strategy for N phases based on the rhythmic law, stimulation action, and stimulation intensity that match each phase; and generate a control instruction based on the control strategy for N phases.

That is, a multi-phase independent adaptation control strategy is provided in this embodiment. The sexual stimulation process usually includes multiple phases with significantly different experiences, and the rhythmic law, stimulation action, and intensity of each phase may be different; and therefore, a unique experience of each phase is accurately reproduced through a process of phase-by-phase matching, phase-by-phase strategy generation, and consolidation into a total instruction.

Exemplarily, a control strategy for four phases is finally determined as follows: The rhythm mode matched with the foreplay phase is the pulse mode; the stimulation action is vibration; and the stimulation intensity is a vibration frequency of 30 Hz. The rhythm mode matched with the plateau phase is the continuous mode; the stimulation action is vibration; and the stimulation intensity is a vibration frequency of 50 Hz. The rhythm mode matched with the orgasm phase is the continuous mode; the stimulation action is tapping; and the stimulation intensity is a vibration frequency of 60 Hz. The rhythm mode matched with the resolution phase is the ramp-down mode; the stimulation action is kneading, and the stimulation intensity is the first level.

Figure 4:
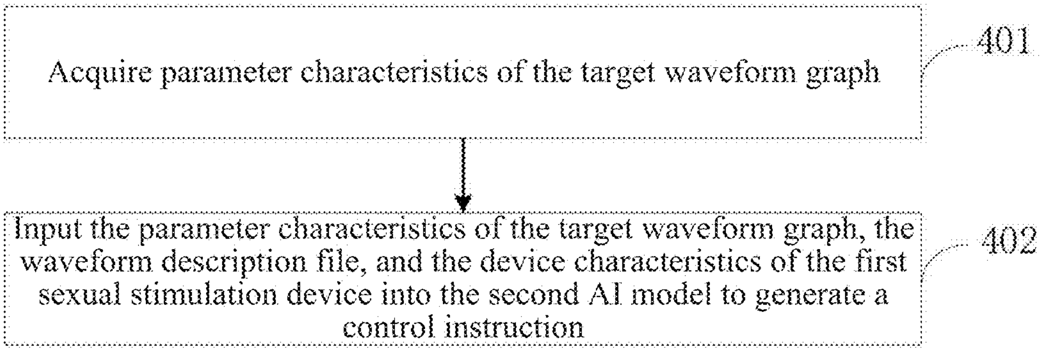
FIG. 4 is a flowchart of steps of a fourth control method for cross-category sexual stimulation devices provided in an embodiment of the present disclosure.

Additionally, another execution process of the second AI model is further provided in an embodiment of the present disclosure, and with reference to FIG. 4, optionally, the matching the waveform description file with the device characteristics of the first sexual stimulation device through a second AI model to generate a control instruction includes: steps 401 to 402.

Step 401: acquire parameter characteristics of the target waveform graph.

Step 402: input the parameter characteristics of the target waveform graph, the waveform description file, and the device characteristics of the first sexual stimulation device into the second AI model to generate a control instruction.

The parameter characteristics of the target waveform graph include at least one of a rhythm mode and an action mode; and the device characteristics of the first sexual stimulation device include at least one of a rhythm mode and an action mode.

It should be noted that the above method enables to achieve more accurate cross-device adaptation through multi-dimensional input of the parameter characteristics of the target waveform graph, the waveform description file, and the device characteristics of the first sexual stimulation device. The waveform description file focuses on an abstract description of the phased experiential characteristics, while the parameter characteristics of the target waveform graph provide more specific mode details, and a combination of the two may completely restore an experiential essence and specific mode of the original waveform. The three-dimensional cooperative input enables the second AI model to more accurately determine "how to reproduce an original mode and experience within a range of device capability".

Optionally, the inputting the parameter characteristics of the target waveform graph, the waveform description file, and the device characteristics of the first sexual stimulation device into the second AI model to generate a control instruction includes: associate the parameter characteristics of the target waveform graph with the device characteristics of the first sexual stimulation device through the second AI model to determine device characteristics that meet parameter conditions; and generating the control instruction by combining the device characteristics that meet the parameter conditions and the waveform description file.

The device characteristics that meet the parameter conditions are determined in the following manner:

First, when the device characteristics of the first sexual stimulation device include the same parameter characteristics in the target waveform graph, the device characteristics are directly adopted.

For example, when the device characteristics of the first sexual stimulation device include vibration and suction (the action mode) and the continuous mode (the rhythm mode). The parameter characteristics in the target waveform graph include suction (the action mode) and the continuous mode (the rhythm mode). The device characteristics meeting the parameter conditions are directly determined: suction and the continuous mode.

Second, when the device characteristics of the first sexual stimulation device do not include the same parameter characteristics in the target waveform graph, device characteristics that meet parameter conditions are determined based on similarity calculation.

For example, when the device characteristics of the first sexual stimulation device include vibration and suction (the action mode), and the parameter characteristics in the target waveform graph include kneading, the device characteristics that meet parameter conditions may be determined based on similarity calculation, and it is assumed that suction is determined as the device characteristic with the highest similarity. It can be understood that when the first sexual stimulation device does not have completely consistent device characteristics, the closest device characteristics are determined through similarity calculation for replacement.

It can be understood that the second AI model adopts a progressive strategy of preferentially matching identical characteristics and then selecting similar characteristics to ensure that the device characteristics maximally match the parameter characteristics of the original waveform in basic modes (the rhythm mode and the action mode), then optimizes the stimulation intensity in combination with the phased experiential characteristics of the waveform description file, and finally generates a control instruction that not only conforms to the device capabilities but also closely aligns with the original experience. The above approach enables to achieve deep coordination between mode matching and target experience and enhance the flexibility of adaptation to various sexual stimulation devices.

For similarity calculations, two similarity calculation methods are provided in an embodiment of the present disclosure.

The first similarity calculation method may specifically include: determine device characteristics that meet parameter conditions based on the similarity between the device characteristics of the first sexual stimulation device and the target parameter characteristics in the target waveform graph.

That is, the similarity between the device characteristics of the first sexual stimulation device and the target parameter characteristics in the target waveform graph is directly compared, and for example, when the device characteristics of the first sexual stimulation device include vibration and suction, and the parameter characteristics in the target waveform graph include kneading, the device characteristics that meet parameter conditions may be determined based on the similarity between the device characteristics of the first sexual stimulation device (including vibration and suction) and the target parameter characteristics (kneading), and for example, when the similarity between suction and kneading is higher than the similarity between vibration and kneading, the device characteristic meeting the parameter conditions is suction.

The above similarity calculation method may specifically be a Jaccard similarity algorithm. The above approach enables to maximally restore the parameter characteristics corresponding to the target waveform graph to approximate hardware consistency.

The second similarity calculation method may specifically include: determine device characteristics that meet parameter conditions based on the similarity between the device characteristics of the first sexual stimulation device and the waveform description file.

That is, this approach emphasizes the consistency for the purpose of experience, and maximally screens out the device characteristics that align with the target experience.

For example, when the waveform description file includes a soothing experience, a similarity between the action mode (kneading) and the soothing experience is greater than a similarity between the action mode (vibration) and the soothing experience.

The above similarity calculation method may specifically be a semantic text matching algorithm. The above similarity calculation method enables to focus more on experience requirements.

Optionally, the acquiring parameter characteristics of the target waveform graph includes: parse the target waveform graph through the first AI model to extract parameter characteristics of the target waveform graph.

For the above process, reference to the description of the foregoing step 201 may be made, which will not be described in detail herein.

Optionally, the first AI model and the second AI model belong to the same AI model. That is, one AI model may be configured in the terminal device to implement the generation of the above waveform description file and a feature matching process. Alternatively, one AI model may be deployed in a cloud terminal or server to implement the generation of the above waveform description file and a feature matching process.

The first AI model and the second AI model belong to the same AI model, which achieves the model architecture unification, simplifies technical implementation of the control method for cross-category sexual stimulation devices, and improves system consistency and efficiency.

Optionally, the method further includes: acquire an operating parameter of the first sexual stimulation device, where the operating parameter includes at least one of a battery level and a temperature; and optimize the control instruction based on the operating parameter of the first sexual stimulation device.

It should be noted that the operating parameter of the sexual stimulation device (such as a low battery level or a high temperature) directly affects its capability to execute a control instruction (for example, the low battery level may lead to reduced intensity, and the high temperature may cause safety risks); and however, a real-time state of the device is usually ignored in the prior art, which results in safety problems caused by the device's failure to stably execute or forcibly execute a feasible instruction. Therefore, a balance between experience reproduction and device safety is achieved through a process of acquiring an operating parameter and then optimizing an instruction based on the operating parameter.

Specific optimization directions include:

Battery level: When a remaining battery level is low (such as a battery level of less than 20%), a power-related parameter (such as an intensity level or frequency) is lowered to reduce energy consumption or shorten a continuous operation duration to prevent the device shutdown during use; and when the battery level is low (such as a battery level of greater than 80%), an original instruction parameter may be retained to ensure experience integrity.

Temperature: When the temperature approaches a safety threshold, the power-related parameter is lowered to reduce heat generation, or short-term shutdown is performed for heat dissipation; and when the temperature exceeds the safety threshold, power is forcibly lowered to a safe power level, or direct device shutdown and user prompt are implemented.

Optionally, the phased experiential characteristics include time parameters; the time parameters are used to describe a duration of each phase; and correspondingly, the control instruction includes a time instruction for controlling the duration of each phase of the first sexual stimulation device to be the same as a duration of a corresponding phase in the target waveform graph.

That is, the phased experiential characteristics in this embodiment include time parameters (i.e., the duration of each phase), and a time instruction is added to the control instruction to ensure that the duration of each phase of the first sexual stimulation device is completely consistent with the duration of a corresponding phase of the target waveform graph. That is, a temporal rhythm of a sexual stimulation experience (such as a duration of a warm-up phase and a duration of an orgasm phase) is a key dimension constituting an overall experience, an overly short warm-up duration may lead to an abrupt experience, an excessively lengthy orgasm may lead to fatigue, and a time deviation affects an experience effect of the original waveform. Therefore, defining the duration of each phase through the time instruction enables to retain time structure integrity of the original experience in cross-device adaptation and enhance an experience consistency among different sexual stimulation devices.

Exemplarily, the phased experiential characteristics may specifically include:

Phase 1 (warm-up phase): a duration of 300 seconds, a low-intensity continuous vibration.

Phase 2 (orgasm phase): a duration of 60 seconds, a medium-intensity pulse vibration.

Phase 3 (soothing phase): a duration of 100 seconds, a low-intensity ramp-down vibration.

The first user uses the first sexual stimulation device to reproduce each phase of the waveform and reproduce the duration of each phase.

Figure 5:
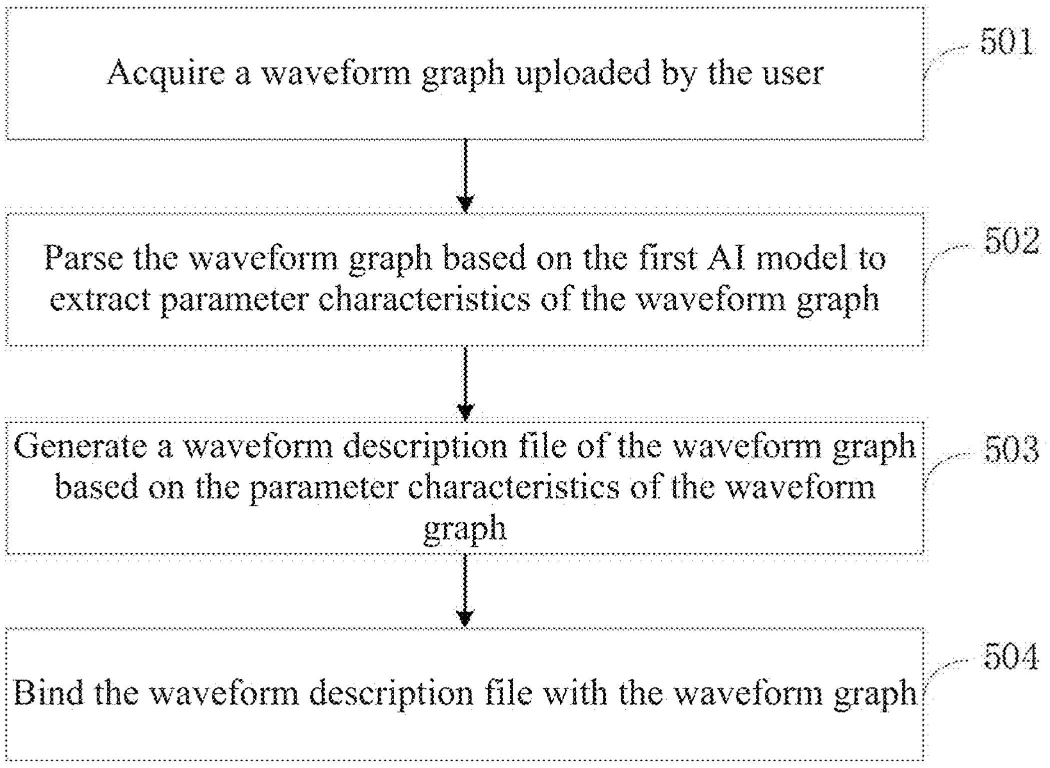
FIG. 5 is a flowchart of steps of a waveform analysis method for cross-category sexual stimulation devices provided in an embodiment of the present disclosure.

With reference to FIG. 5, based on the same inventive concept, a waveform analysis method for cross-category sexual stimulation devices is provided in the present disclosure, the method may be applied to a server or a cloud server, and the method specifically includes: steps 501 to 504.

Step 501: acquire a waveform graph uploaded by the user. The waveform graph represents a sexual stimulation process of using a sexual stimulation device by the user.

Step 502: parse the waveform graph based on the first AI model to extract parameter characteristics of the waveform graph.

Step 503: generate a waveform description file of the waveform graph based on the parameter characteristics of the waveform graph.

The waveform description file represents phased experiential characteristics corresponding to the waveform graph.

Step 504: bind the waveform description file of the waveform graph with the waveform graph.

For the above process, reference to the descriptions in the foregoing embodiments may be made, which will not be described in detail herein.

Figure 6:
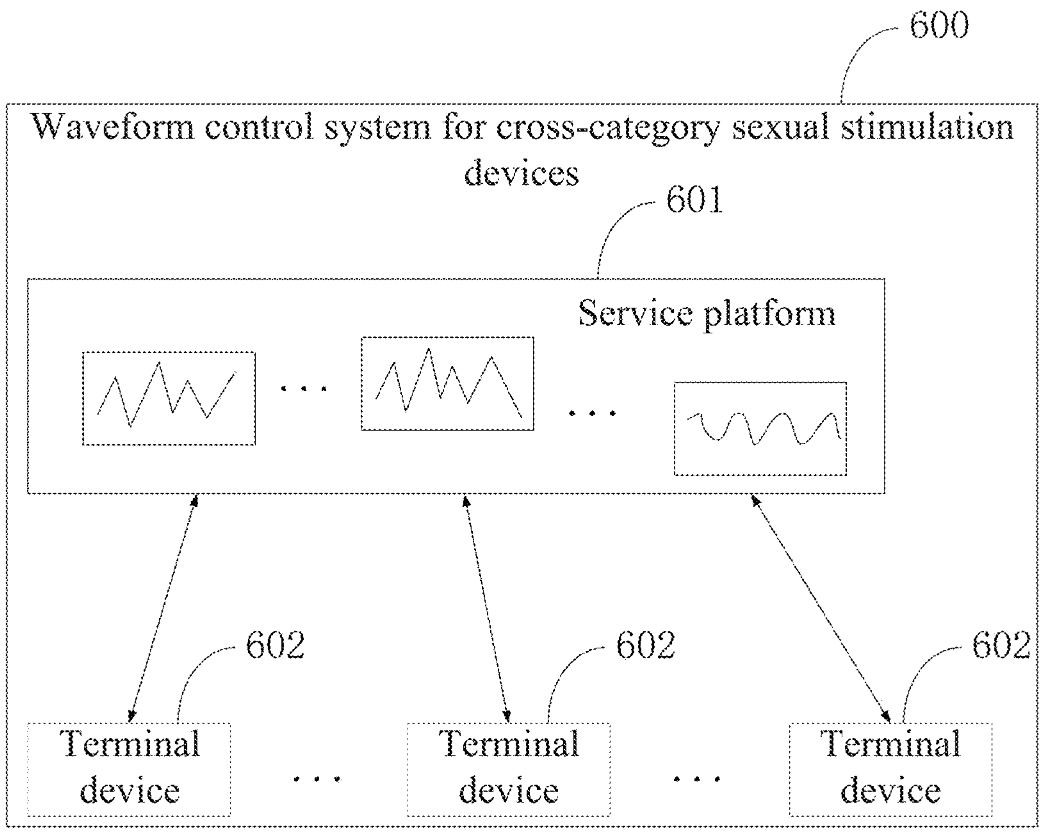
FIG. 6 is a block diagram of modules of a waveform control system for cross-category sexual stimulation devices provided in an embodiment of the present disclosure.

With reference to FIG. 6, based on the same inventive concept, a waveform control system 600 for cross-category sexual stimulation devices is further provided in an embodiment of the present disclosure, including:

A service platform 601 configured to display waveform graphs uploaded by different users, where the waveform graphs represent sexual stimulation processes of using sexual stimulation devices by different users.

A plurality of terminal devices 602, configured to acquire a waveform description file of the target waveform graph in response to a target user's operation of selecting a target waveform graph, where the waveform description file is generated after parsing the target waveform graph by a first AI model and represents phased experiential characteristics corresponding to the target waveform graph; acquire device characteristics of a sexual stimulation device of the target user, where the target user's sexual stimulation device and a sexual stimulation device corresponding to the target waveform graph are sexual stimulation devices of the same category or different categories; match the waveform description file with the device characteristics of the target user's sexual stimulation device through a second AI model to generate a control instruction; and send the control instruction to the target user's sexual stimulation device to execute stimulation.

It should be noted that each of the terminal devices 602 may be communicatively connected to at least one sexual stimulation device.

For a specific execution logic of the system 600, reference may be made to the descriptions in the foregoing embodiments, which will not be described in detail herein.

Figure 7:
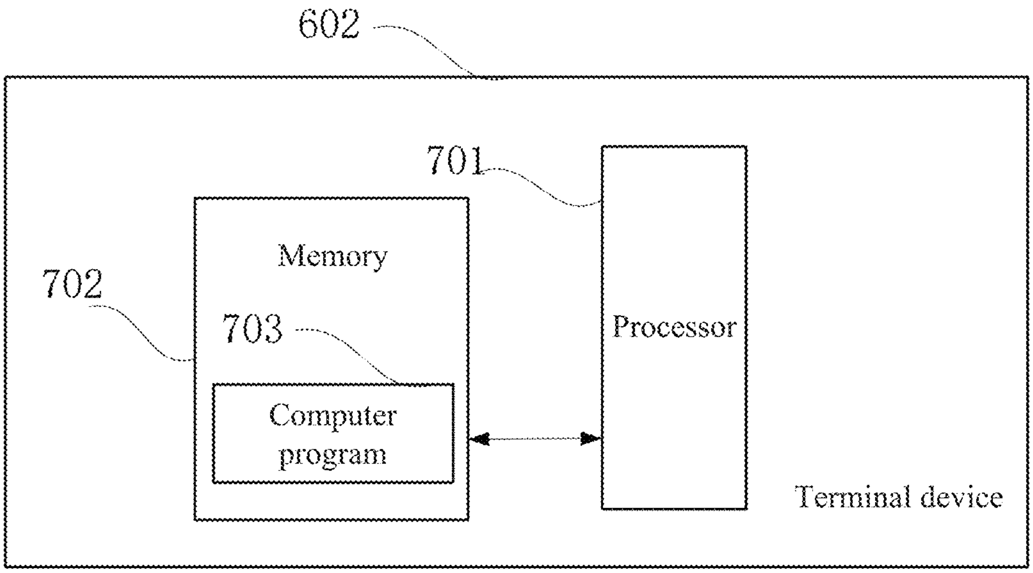
FIG. 7 is a block diagram of modules of a terminal device provided in an embodiment of the present disclosure.

With reference to FIG. 7, a modular frame body of the terminal device 602 is provided in an embodiment of the present disclosure. The terminal device 602 includes: at least one processor 701 (only one is shown in FIG. 7), a memory 702, and a computer program 703 stored in the memory 702 and executable on the at least one processor 701, and when the processor 701 executes the computer program 703, the steps of the method in any of the foregoing embodiments are implemented.

The terminal device 602 may be a mobile phone, a tablet computer, a laptop computer, or the like.

Those skilled in the art may understand that FIG. 7 illustrates merely an example of the terminal device 602 and does not constitute a limitation on the terminal device 602. The device may include more or fewer components than those shown in the figure, or combine certain components or different components.

The processor 701 may be a central processing unit (CPU), a microprocessor unit (MPU), and the processor 701 may further be any other general-purpose processor, a digital signal processor (DSP), an application specific integrated circuit (ASIC), a field-programmable gate array (FPGA), or any other programmable logic device (PLD), a discrete gate or a transistor logic device, or a discrete hardware component, etc. The general-purpose processor can be a microprocessor, or the processor can also be any conventional processor.

In some embodiments, the memory 702 may be an internal storage unit of the terminal device 602, such as a hard drive or a memory of the terminal device 602. In some embodiments, the memory 702 may further be an external storage device of the terminal device 602, such as a plug-in hard drive, a smart media card (SMC), a secure digital (SD) card, a flash card, and the like equipped on the terminal device 602. Further, the memory 702 may include both the internal storage unit and the external storage device of the terminal device 602.

It should be noted that the above system, device, and other content are based on the same inventive concept as the method embodiments of the present disclosure, and the method embodiments may be referred to for details of the modules designed for the system, the steps executed by the device, and the resulting technical effects, which will not be described in detail herein.

In an embodiment of the present disclosure, a computer-readable storage medium is further provided. A computer program is stored in the computer-readable storage medium, and when the computer program is executed by the processor, the steps in each of the above method embodiments may be implemented.

In an embodiment of the present disclosure, a computer program product is provided, and when the computer program product runs on a mobile terminal, the mobile terminal may implement the steps in each of the above method embodiments when executing the computer program product.

If the integrated units are implemented in the form of the software functional units and sold or used as independent products, they may be stored in one computer-readable storage medium. Based on such understanding, the present disclosure implements all or part of processes of the methods in the above embodiments by instructing relevant hardware through a computer program. The computer program may be stored in a computer-readable storage medium, and when the computer program is executed by the processor, the steps in each of the above method embodiments may be implemented. The computer program includes computer program codes, and the computer program codes may exist in the form of source code, object code or executable files, or in some intermediate forms. The computer-readable medium may include at least: any entity or device capable of carrying a computer program code to a photographing device/electronic device, a recording medium, a computer memory, a read-only memory (ROM), a random access memories (RAM), an electrical carrier signal, a telecommunication signal, a software distribution medium, and the like, such as a USB flash drive, a mobile hard disk drive, a diskette, an optical disk, or the like.

In the above embodiments, each embodiment is described with its own emphasis. For parts that are not described in detail or recorded in a certain embodiment, please refer to the relevant descriptions of other embodiments.

Those of ordinary skill in the art may appreciate that the units and algorithm steps described in combination with the embodiments disclosed herein can be implemented through electronic hardware, or a combination of computer software and electronic hardware. Whether these functions are performed in electronic hardware or software depends on the specific application and design constraints of the technical solution. Those skilled in the art can use different methods to implement the described functions for each particular application, but such implementation should not be considered to be beyond the scope of the present disclosure.

The above embodiments are merely used to describe the technical solution of the present disclosure rather than limiting the same. Although the present disclosure has been described in detail with reference to the foregoing embodiments, those skilled in the art should understand that the technical solution described in the foregoing embodiments may still be modified, or some technical features therein may be equivalently substituted. However, these modifications or substitutions do not make the essence of the corresponding technical solution deviate from the spirit and scope of the technical solutions of each embodiment of the present disclosure, and shall fall within the protection scope of the present disclosure.

What is claimed is:

1. A control method for cross-category sexual stimulation devices, comprising:

in response to a first user's operation of selecting a target waveform graph, acquiring a waveform description file of the target waveform graph, wherein the waveform description file is generated after parsing the target waveform graph by a first AI model and represents phased experiential characteristics corresponding to the target waveform graph, and the target waveform graph is uploaded by a second user and represents a sexual stimulation process of using a second sexual stimulation device by the second user;

acquiring device characteristics of a first sexual stimulation device of the first user, wherein the first sexual stimulation device and the second sexual stimulation device are sexual stimulation devices of a same category or different categories;

matching the waveform description file with the device characteristics of the first sexual stimulation device through a second AI model to generate a control instruction; and sending the control instruction to the first sexual stimulation device to execute stimulation.

2. The control method for cross-category sexual stimulation devices according to claim 1, wherein the waveform description file of the target waveform graph is obtained by the following steps comprising:

parsing the target waveform graph through the first AI model to extract parameter characteristics of the target waveform graph; and generating the waveform description file of the target waveform graph based on the parameter characteristics of the target waveform graph.

3. The control method for cross-category sexual stimulation devices according to claim 2, wherein the parameter characteristics of the target waveform graph comprise at least one of a rhythm mode, a numerical contour, and an action mode.

4. The control method for cross-category sexual stimulation devices according to claim 3, wherein the rhythm mode comprises at least one of a continuous mode, a pulse mode, a wave mode, a variable frequency mode, a ramp-up mode, or a ramp-down mode.

5. The control method for cross-category sexual stimulation devices according to claim 3, wherein the action mode comprises at least one of vibration, kneading, tapping, rolling, acupressure, sucking, squeezing, swinging, and telescoping.

6. The control method for cross-category sexual stimulation devices according to claim 2, further comprising:

receiving a usage experience description from the first user; and optimizing the first AI model based on the usage experience description.

7. The control method for cross-category sexual stimulation devices according to claim 1, wherein the device characteristics comprise functional features and stimulation intensity parameters; and the functional features comprise a rhythm mode and an action mode.

8. The control method for cross-category sexual stimulation devices according to claim 7, wherein the matching the waveform description file with the device characteristics of the first sexual stimulation device through the second AI model to generate the control instruction comprises:

inputting the waveform description file and the device characteristics of the first sexual stimulation device into the second AI model to determine a time rhythm, a stimulation action, and a stimulation intensity of the first sexual stimulation device that match the waveform description file; and generating the control instruction based on the matched time rhythm, stimulation action, and stimulation intensity.

9. The control method for cross-category sexual stimulation devices according to claim 8, wherein the phased experiential characteristics comprise experiential characteristics of N phases, and N is a positive integer greater than or equal to 2;

the matching the waveform description file with the device characteristics of the first sexual stimulation device through the second AI model to generate the control instruction comprises:

inputting the waveform description file and the device characteristics of the first sexual stimulation device into the second AI model to determine the time rhythm, the stimulation action, and the stimulation intensity of the first sexual stimulation device that match each phase of the N phases;

determining a control strategy for the N phases based on the time rhythm, the stimulation action, and the stimulation intensity that match each phase of the N phases; and generating the control instruction based on the control strategy for the N phases.

10. The control method for cross-category sexual stimulation devices according to claim 9, wherein N is four; and the four phases comprise a foreplay phase, a plateau phase, an orgasm phase, and a resolution phase.

11. The control method for cross-category sexual stimulation devices according to claim 1, wherein the matching the waveform description file with the device characteristics of the first sexual stimulation device through the second AI model to generate the control instruction comprises:

acquiring parameter characteristics of the target waveform graph; and inputting the parameter characteristics of the target waveform graph, the waveform description file, and the device characteristics of the first sexual stimulation device into the second AI model to generate the control instruction;

wherein the parameter characteristics of the target waveform graph comprise at least one of a rhythm mode and an action mode; and the device characteristics of the first sexual stimulation device comprise at least one of a rhythm mode and an action mode.

12. The control method for cross-category sexual stimulation devices according to claim 11, wherein the inputting the parameter characteristics of the target waveform graph, the waveform description file, and the device characteristics of the first sexual stimulation device into the second AI model to generate the control instruction comprises:

associating the parameter characteristics of the target waveform graph with the device characteristics of the first sexual stimulation device through the second AI model to determine device characteristics that meet parameter conditions; and generating the control instruction by combining the device characteristics that meet parameter conditions and the waveform description file;

wherein the device characteristics that meet parameter conditions are determined in the following manner: when the device characteristics of the first sexual stimulation device comprise the same parameter characteristics in the target waveform graph, the device characteristics are directly adopted; and when the device characteristics of the first sexual stimulation device do not comprise the same parameter characteristics in the target waveform graph, the device characteristics that meet parameter conditions are determined based on a similarity calculation.

13. The control method for cross-category sexual stimulation devices according to claim 12, wherein the determining the device characteristics that meet parameter conditions based on the similarity calculation comprises:

determining the device characteristics that meet parameter conditions based on a similarity between the device characteristics of the first sexual stimulation device and target parameter characteristics in the target waveform graph.

14. The control method for cross-category sexual stimulation devices according to claim 12, wherein the determining the device characteristics that meet parameter conditions based on the similarity calculation comprises:

determining the device characteristics that meet parameter conditions based on a similarity between the device characteristics of the first sexual stimulation device and the waveform description file.

15. The control method for cross-category sexual stimulation devices according to claim 11, wherein the acquiring parameter characteristics of the target waveform graph comprises:

parsing the target waveform graph through the first AI model to extract the parameter characteristics of the target waveform graph.

16. The control method for cross-category sexual stimulation devices according to claim 1, wherein the first AI model and the second AI model belong to the same AI model.

17. The control method for cross-category sexual stimulation devices according to claim 1, further comprising:

acquiring an operating parameter of the first sexual stimulation device, wherein the operating parameter comprises at least one of a battery level and a temperature; and optimizing the control instruction based on the operating parameter of the first sexual stimulation device.

18. The control method for cross-category sexual stimulation devices according to claim 1, wherein the phased experiential characteristics comprise a time parameter of each phase of N phases, wherein N is a positive integer greater than or equal to 2, and for each phase of the N phases, the time parameter is used to describe a duration of the phase; and correspondingly, the control instruction comprises a time instruction for controlling the duration of each phase of the first sexual stimulation device to be the same as a duration of a corresponding phase in the target waveform graph.

19. A waveform analysis method for cross-category sexual stimulation devices, comprising:

acquiring a waveform graph uploaded by a user, wherein the waveform graph represents a sexual stimulation process of using a sexual stimulation device by the user;

parsing the waveform graph through a first AI model to extract parameter characteristics of the waveform graph;

generating a waveform description file of the waveform graph based on the parameter characteristics of the waveform graph, wherein the waveform description file represents phased experiential characteristics corresponding to the waveform graph; and binding the waveform description file of the waveform graph with the waveform graph.

20. A waveform control system for cross-category sexual stimulation devices, comprising:

a service platform configured to display waveform graphs uploaded by different users, wherein the waveform graphs represent sexual stimulation processes of using sexual stimulation devices by the different users; and a plurality of terminal devices, configured to acquire a waveform description file of a target waveform graph in response to a target user's operation of selecting the target waveform graph, wherein the waveform description file is generated after parsing the target waveform graph by a first AI model and represents phased experiential characteristics corresponding to the target waveform graph; acquire device characteristics of a sexual stimulation device of the target user, wherein the target user's sexual stimulation device and a sexual stimulation device corresponding to the target waveform graph are sexual stimulation devices of the same category or different categories; match the waveform description file with the device characteristics of the target user's sexual stimulation device through a second AI model to generate a control instruction; and send the control instruction to the target user's sexual stimulation device to execute stimulation.

* * * * *